Figure 5:
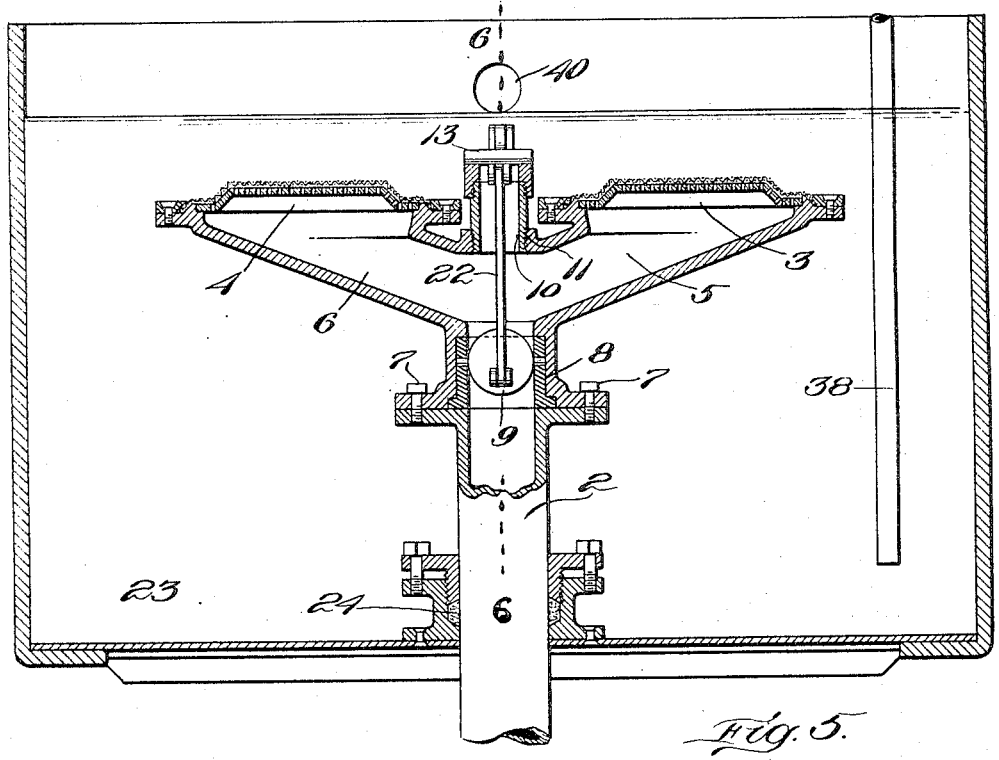

O. D. HOGUE.
PULP MOLDING MACHINE.
APPLICATION FILED FEB. 26, 1915.
1,203,197.
Patented Oct. 31, 1916.
4 SHEETS—SHEET 1.
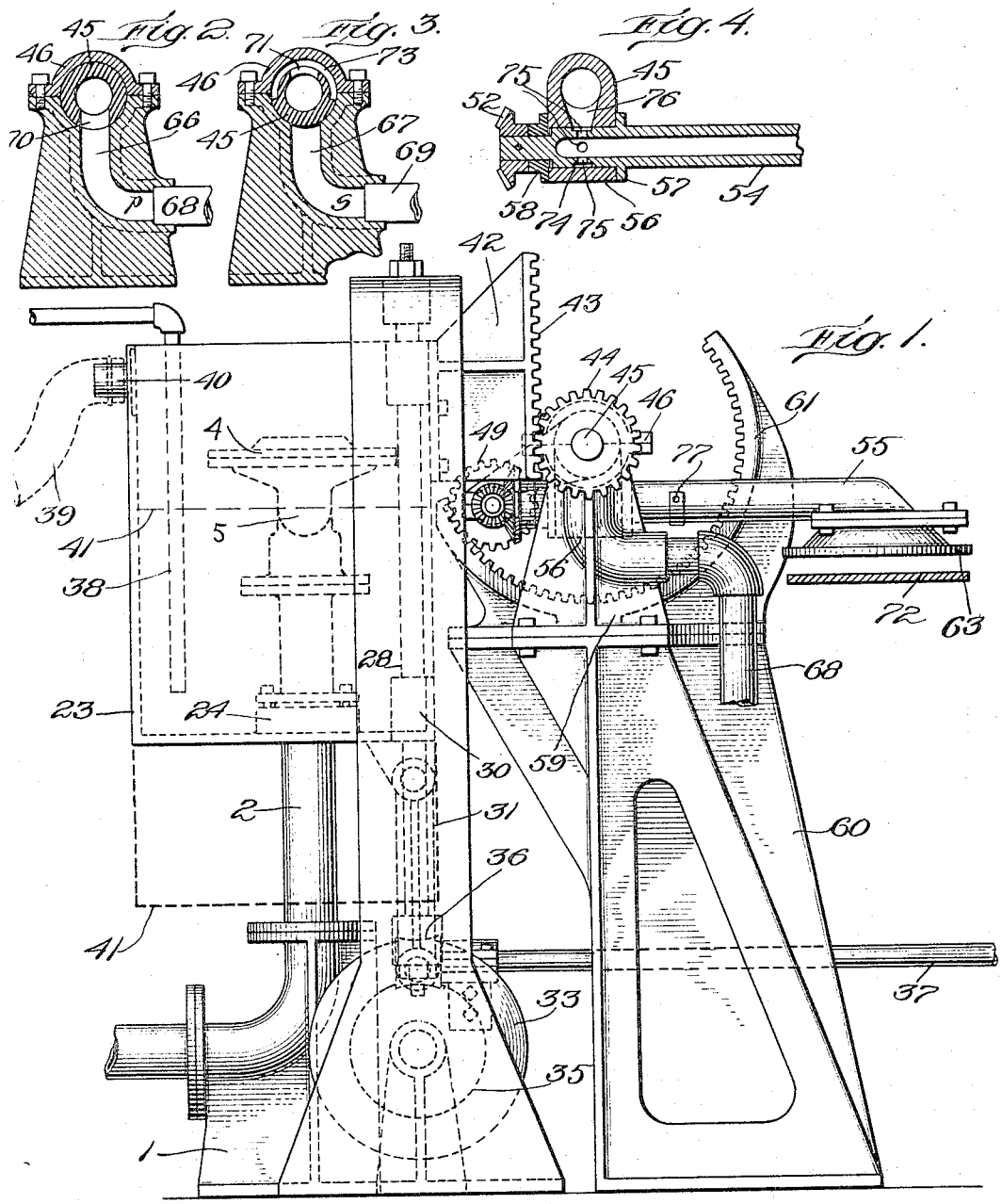

O. D. HOGUE.
PULP MOLDING MACHINE.
APPLICATION FILED FEB. 26, 1915.

1,203,197.

Patented Oct. 31, 1916.
4 SHEETS—SHEET 3.

Witnesses:
Fred W McArdle
C. B. Maynadier

Inventor:
Oliver D. Hogue,
by Geo. W. Maxwell
Atty.

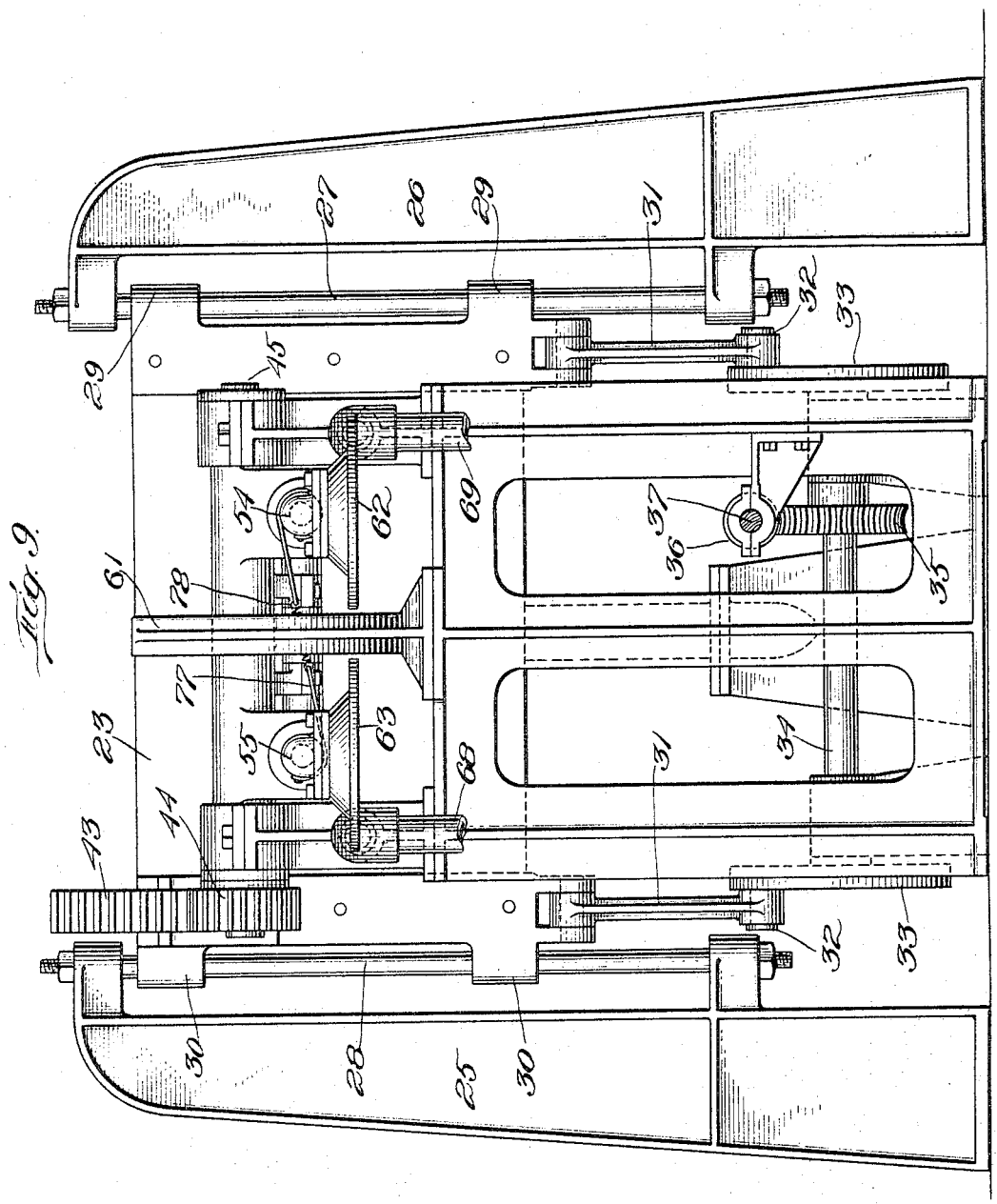

UNITED STATES PATENT OFFICE.

OLIVER D. HOGUE, OF BROOKLINE, MASSACHUSETTS, ASSIGNOR TO GEORGE H. MAXWELL, OF BOSTON, MASSACHUSETTS.

PULP-MOLDING MACHINE.

1,203,197. Specification of Letters Patent. Patented Oct. 31, 1916.

Application filed February 26, 1915. Serial No. 10,811.

*To all whom it may concern:*

Be it known that I, OLIVER D. HOGUE, a citizen of the United States, and resident of Brookline, in the county of Suffolk and State of Massachusetts, have invented an Improvement in Pulp-Molding Machines, of which the following description, in connection with the accompanying drawings, is a specification, like numerals on the drawings representing like parts.

My invention is a machine for making articles of the kind shown and described in the patent of M. L. Keyes, No. 740,023 of September 29, 1903, and has for its object the elimination of certain disadvantages of the Keyes machine, and simplfying of the apparatus by eliminating the two-part traveling mold. In accomplishing my object I employ a one-part stationary mold as in Wheeler and Jerome, Patent No. 66,919, July 16, 1867, and Kendall and Trested, Patent No. 125,740, April 16, 1872, and in common with the disclosures of the aforesaid patents I employ suction for securing the required deposit of pulp on the stationary mold. Also as in said Keyes transferring device, I employ suction for transferring the formed but still wet pulp article, a chief distinction of my invention, being, however, that instead of requiring a more or less complicated two-part mold, as in Keyes, one of whose parts is necessary to remove the molded article from the other part and carry it to position to be delivered to and received by the transferring device, I do away with this complicated construction and system and engage the transferring device directly with the single-member stationary mold so as to transfer the molded article directly from the face of the mold to the conveyer belt. In this respect my invention employs certain features of the Kasson machine, (Patent No. 828,408, August 14, 1906). For getting the water out of the pulp I rely primarily upon a strong suction, although I do not wish to preclude myself from using some squeezing pressure for hastening or aiding the removal of the water if desired, although I make no particular point of this, or claim to it, as this has long been the common way of removing the water, as mentioned in Wheeler *et al.*, Kasson and Keyes above, Le Clere, Patent No. 84,835, December 8, 1868, Cook, Patent No. 217,729, July 22, 1879, Adams, Patent No. 244,156, July 12, 1881, and Keyes, Patent No. 354,708, December 21, 1886.

In connection with a novel combination and coöperation of the aforesaid elements and agencies, I employ a self-agitating stuff chest or tank for supplying the pulp to the stationary mold, which rises and falls in timed relation to the transferring mechanism. This tank is relatively small, and, even with its load of pulp and water, is relatively light and has a comparatively rapid movement, which, in connection with the inflow of liquid pulp, maintains the desired agitation of the pulp and water so as to keep the delivery thereof to the mold uniform and constant, and because of the lightness and balanced construction of the parts, as will be more fully apparent presently, it becomes practicable to insure absolutely correct timing of the alternate molding and transferring operations by having one operate the other, the transferring mechanism being herein shown as preferably operated by the rising and falling movements of the tank. Preferably also I depend upon the latter for controlling the opening and closing of the suction apparatus of the stationary mold, *i. e.* for starting and breaking the vacuum or suction which operates on the pulp to cause the right deposit on the stationary mold and which squeezes or sucks out the water from the deposited pulp as soon as the tank has lowered sufficiently to cause the stationary mold to emerge from the water in the tank. As the tank rises it first operates the air valves so as to close to the outside air the air chamber of the stationary mold, and open the thus closed chamber to the suction pipe, and then immediately after the still rising tank submerges the stationary mold in the stuff or liquid pulp, and either continues to rise or remains stationary in this raised position the required length of time for permitting the deposit of the required thickness of pulp on the mold. For accomplishing a separate object I prefer to make the movement of the tank continuous. This separate object is the operation of the transferring device. As the tank begins its upward movement the transferring device begins its transferring movement with the molded article, first lifting said article from the mold, bottom side up, and swinging it over in a semicircular path, so that the article is brought over the conveyer belt at one side of the tank in position to be deposited, this position being arrived at by any suitable mechanism, that herein shown consisting of means for giving the transferring device an axial rotation in the course of its swinging movement, so that it not only starts from the stationary mold in a depending position carrying the molded article on its underside by suction, but it ends its swinging movement in substantially the same position with the molded article held on its underside by suction, and just as it arrives over the conveyer belt this suction stops and is replaced by a puff of air under sufficient pressure to separate the conveyed pulp article from the transferring device to the conveyer belt. The latter receives the transferred articles from a series of similar molding tanks and molds and carries them through a drier, which, being common to various pulp molding systems, I have not deemed it necessary to show.

Having delivered the article to the conveyer, and the tank having reached its highest travel, the tank then begins to descend, which movement causes the transferring device to begin to swing away from the conveyer belt and over toward the stationary mold. The suction on the mold continues throughout the period that the stuff level is above the mold, the movements of the tank being so timed that this period is just right to cause the proper deposit on the mold. As the tank continues to lower and the stuff level gets below the mold, the suction is cut off by the opening of the mold chamber to the outside air and the closing of the section pipe, and thereupon the transferring device, which has meanwhile been swinging over toward the mold, reaches the mold in proper registering position to receive the article which is on the upper side of said mold. As the transferring device engages this molded article, a powerful suction is applied thereto which instantly loosens the article from the mold and transfers said article to the under side of the transferring device, this transfer being rendered easy by the fact that there is no longer any suction being applied to the article on the mold, as the mold chamber is then freely open to the outside air. By the time the molded article has been received by the transferring device, the stuff tank has reached the limit of its downward travel and immediately starts upward again, which movement instantly raises the transferring device on its upward swing, which it continues upward, outward and over as the tank rises and submerges the mold to permit a fresh deposit of pulp to be sucked on to the mold as before. This movement of the tank is sufficiently rapid to keep a continuous agitation of the pulp so that a uniform deposit is insured. It is as rapid as the proper movement of the transferring device and the sucking thereon of the article and the puffing off or delivery therefrom of the article will permit. Its timing is largely determined by the period of immersion required by the mold. This period is made short by providing a powerful suction together with a ready runway for the air and water which are removed by the mold. This brings me to a further important feature of my invention. By having the mold stationary and horizontal so as to face upward I am enabled to take advantage of natural forces, and not only pull the pulp downward by gravity as well as by the suction, but the deleted water and air find their most convenient and natural discharge by the converging stationary channels or chambered outlets, each converging to a central pipe or stand pipe connecting with the suction pump.

My apparatus makes it impossible for any water sealing or pockets to interfere with the rapid and continuous discharge of the water and air, as the arrangement is such that the natural discharge of the water and air is simply aided and accelerated by the pump. Moreover, by having the mold, discharge chamber and passages of the stand pipe stationary and vertical, the rapid elimination of the water from the stuff which is deposited on the top face of the horizontal mold is greatly facilitated as well as the apparatus is simplified, made economical, free from liability to wear out and get out of order, and great strength and stability are secured. By having the mold apparatus stationary or immovable and fixed, its life is prolonged, its liability to injury and to get out of order lessened, and the moving parts are relegated to the outside air, being entirely and continuously free from the stuff, i. e. they are never immersed. But probably the greatest advantage of this arrangement is that it thereby secures a larger output of molded articles for each mold, because each mold is in continuous operation, as the transferring device begins to take the article from the mold the moment that the stuff lowers so as to expose the mold.

The various details and further advantages will be set forth in connection with the accompanying drawings, and the invention will be further defined in the appended claims.

Figures 6, 7:
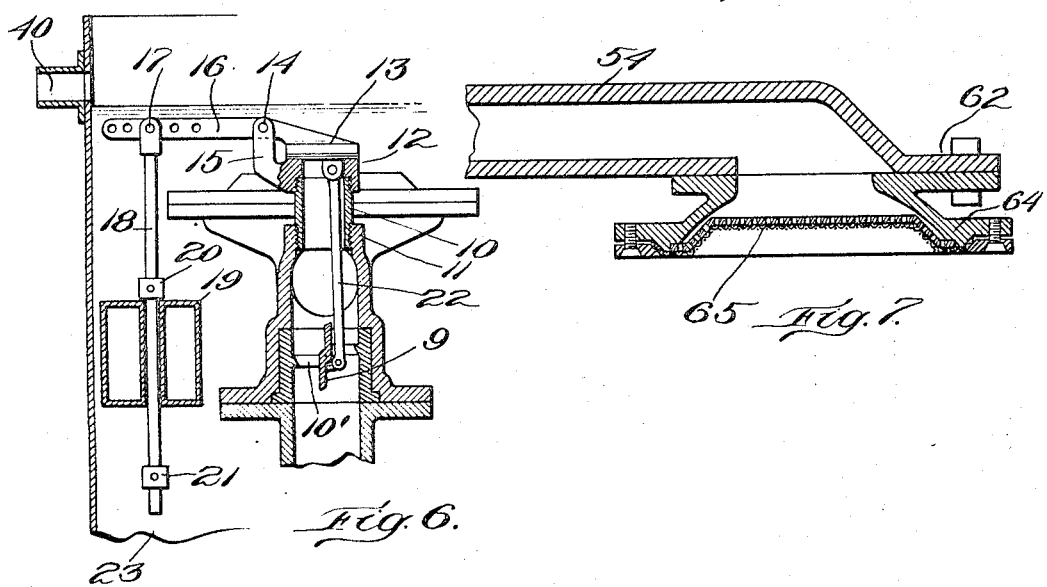
Figure 8:
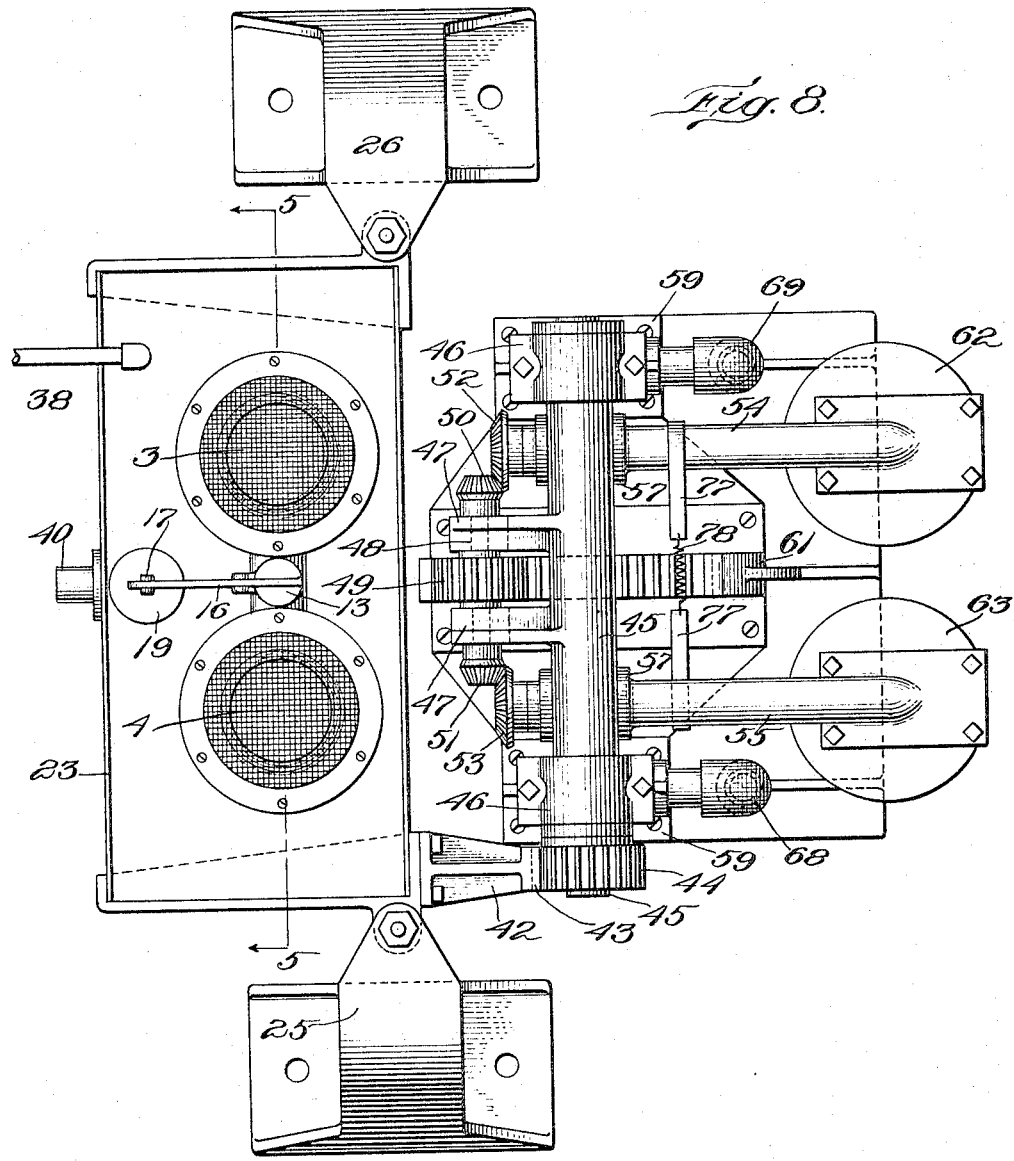

In the drawings in which I have illustrated a preferred embodiment of my invention, Figure 1 is a view of the complete machine in side elevation; Figs. 2, 3 and 4 are sectional details of the various valve and pipe connections of the transferring device; Fig. 5 is a central vertical sectional view on the line 5—5, Fig. 8; Fig. 6 is a vertical sectional detail on the dotted line 6, Fig. 5; Fig. 7 is a central longitudinal vertical section of the receiving and discharging end of one of the transferring devices; Fig. 8 is a top plan view of the machine, and Fig. 9 is a view of the machine in rear elevation.

One object of my invention is to provide an apparatus which can readily be extended or have its units economically and conveniently multiplied to fit the requirements of any given plant and accordingly I have herein shown simply one unit.

Extending upwardly from a heavy base 1 is a stationary stand pipe or vacuum pipe 2, Figs. 1, 5 and 6, which connects with any suitable source of vacuum, as an ordinary paper mill suction pump (not shown), and on the upper end of this pipe is bolted the stationary mold already referred to. As herein shown this mold is in the form of a rosette or multi-mold form, which, for convenience, is shown as provided with two molds or shaping heads 3, 4, which may be of any well known or preferred construction and therefore not herein described in detail. Branch inclined pipes 5, 6 communicate from the mold proper to the pipe 2, being herein shown as formed in one casting and removably secured by bolts 7 to the top flange of the stand pipe. This construction has the advantage of facilitating the removal of the head and the substitution of another whenever the style of article to be molded is changed. Housed within the lower end or neck portion of this casting or top piece or head is the casting 8, preferably of brass or other non-corrosive metal, in which is journaled a butterfly valve 9 and which constitutes a combined valve seat and housing therefor. This butterfly valve has its edges beveled and the seat inclined correspondingly as shown at 10', Fig. 6, in order to make a tight closing fit and at the same time insure that the valve seat will be kept washed clean by the downward flow of the water. Immediately above the valve 9 is a vacuum-breaker valve construction shown as a pipe nipple 10, screwed into a threaded base 11 of the main casting, and having screwed onto its upper end a valve seat 12, against which closes a leather faced valve 13, pivoted at 14 to an ear 15 on the valve seat casting. This flap valve has its stem lever 16 adjustably connected at 17 to a depending float-stem 18 which carries a combination weight and float 19, free to slide between adjustable stops 20 and 21. The butterfly valve 9 and vacuum-breaker valve 13 are connected for reciprocal action by a connecting rod 22.

Arranged to slide up and down on the stand pipe 2 is a tank 23 having a water tight and yet sliding fit by means of a gland 24 around the stand pipe 20, which, in a slight degree serves to guide the tank. The tank however is mainly guided by opposite supporting columns 25, 26, provided with relatively heavy guide rods 27, 28, for receiving end ears 29, 30, of the tank, and the tank is raised and lowered by connecting rods 31, extending from adjacent the lower ears 29, 30 to wrist pins 32 on wrist pin plates or wheels 33, at the opposite ends of a shaft 34 which carries a worm wheel 35, driven by a worm 36 and shaft 37. The stuff is supplied to the tank by a stationary pipe 38 and maintained at the desired level by an overflow hose 39 leading back to the stuff pump, connecting with the hose nipple and aperture 40. The tank is shown in Figs. 1, 5 and 6 at the extreme of its upward movement and the extreme of its downward movement is indicated by the dotted lines 41. At one side, herein shown as bolted to the casting which carries the ears 30, I provide a heavy rack bar casting 42, whose rack bar 43 meshes with a pinion 44, Figs. 1, 8 and 9, fast on a shaft or casting 45, journaled in end bearings 46 between which it is provided with forwardly extending arms 47 in which is journaled a short shaft 48 carrying intermediate its ends a relatively heavy pinion or toothed gear 49, and at its ends beveled pinions 50, 51, which mesh with gears 52, 53, on the ends of hollow arms 54, 55, mounted in journals 56, formed in the under side of the casting 45 as best shown in Fig. 4. The hollow arms 54, 55 have shoulders 57 formed thereon to fit against these journals, and adjustable collars 58 are provided around said arms at the opposite sides of the journals and between the journals and beveled gears for aiding in closing the joint. The end bearings 46 for all this mechanism are formed on the upper ends of heavy brackets 59, supported on a heavy standard or base casting 60. At the top of this casting between the opposite brackets 59 is a heavy internal gear or circular rack 61, in which the pinion 49 meshes. Thus it will be seen that as the shaft casting 45 rotates over to the left, Figs. 1 and 8, and thereby swings the pinion 49 down to the right, the engagement of said pinion with said internal gear or rack 61 will rotate the pinion, and thereby, through the beveled gears 50, 52, at one end, and 51, 53 at the other end, will rock the hollow arms 54, 55. These arms at their outer ends carry transferring devices 62, 63. One of these is shown in sectional detail in Fig. 7, where it will be seen that it has a head 64, provided with a perforated receiving mouth 65, having a complemental shape with relation to the mold 3, 4, so that it will be capable of sucking onto it the molded article without any danger of distorting the latter. This head is likewise made removable to facilitate the quick changing of the apparatus to fit different models or articles being made by the molds 3, 4.

The shaft casting 45 is hollow and connects at its opposite ends by similar passages 66, 67, Figs. 2 and 3, to pipes 68, 69, one of which, the former, for instance, is a pressure pipe and the other a suction pipe, and the hollow shaft 45 is provided with opposite ports 70, 71, as clearly shown in Figs. 2 and 3 for communicating alternately with the source of pressure and with the source of suction. This is so arranged that with the arms 54, 55 in their full line position ready to discharge the molded articles on the conveyer belt 72, they communicate by means of the shaft 45 with the pressure pipe, whereas, when said arms are in their reverse position over the molds, they then communicate by means of the hollow shaft 45 with the suction pipe, the latter maintaining a long period of communication by means of an annular passage or extension 73 of the port 71, Fig. 3. To make continuous the pressure or suction communication between the hollow shaft 45 and the arms 54, 55, I form an annular passage 74 around each arm as shown in Fig. 4, and provide a series of radial openings 75 thereinto, said passage opening into a port 76 of the hollow shaft 45. To prevent any tendency of backlash or improper relative positioning of the two transferring devices 62, 63, I connect their arms 54, 55 by means of ropes or bands 77 and a spring 78, said bands being passed around the arms in different directions so as to maintain uniform tension and tend to hold the beveled gears at all times in tight mesh in the same direction and thereby prevent chatter or looseness and uncertainty of registration movement.

In operation, the pulp and water, or stuff, as it is called in this art, is turned on through the pipe 38 and as soon as the tank 23 has reached its fixed level (as indicated when it begins to flow from the nipple or overflow opening 40), the machine is started and as the tank rises it first acts upon the float 19 to raise the rod 18 and thereby lower the flap valve 13 so as to close the mold chamber to the outside atmosphere and open the butterfly valve 9 in the suction pipe. By the time this has been accomplished, the stuff is just rising over the molds 3, 4, and accordingly the natural tendency of the stuff to fall by gravity on top of these molds is aided and accelerated by a powerful suction which then begins to take place by reason of the opening of the valve 9. The tank continues to rise and then fall for a sufficient period to insure the right thickness of deposit of pulp on the mold. Said pulp is firmly molded thereon because of the heavy suction on the under side, and the corresponding heavy pressure on the upper side, which squeezes and extracts substantially all of the free water from the layer which is in immediate contact with the molds. This water flows by gravity into the chamber and thence down the inclined channels 5, 6, and stand pipe 2. I regard this as a very decided advantage of my invention. The water takes care of itself, and gravity aids also in the deposit and this all takes place with the molds stationary and without requiring any power to lift or manipulate the molds or any parts thereof. While this molding process has been taking place, by an upward movement of the tank and the succeeding lowering movement thereof, the transferring devices have been gradually brought over from their full line position in Fig. 1, ready to take away the molded articles as soon as the tank has been lowered sufficiently to expose the molds. Accordingly as the tank reaches its lowermost position the transferring devices are brought into overhanging engagement with the molded articles just after the falling of the float 19 has closed the suction valve 9, and opened the vacuum-breaker valve 13, so as to release the molded articles from the molds. At the same moment the final lowering swing of the transferring devices has brought the port 71 of their shaft 45 into open communication with the suction pipe 69, so that the transferring devices immediately apply suction to the molded articles on the molds and then start back on their return swing, maintaining said suction by means of the annular extension 73 of the port 71, until the transferring devices have arrived over the belt whereupon the gentle air pressure or gentle expiration of air removes the articles from the transferring devices and drops them gently onto the belt 72. These swinging movements of the transferring arms 54, 55 are accomplished by the engagement of the rack 43 with the pinion 44 and the consequent rotation of the hollow shaft 45. As this swinging movement takes place the arms are rocked by the engagement of the gear 49 with the stationary rack or internal gear 61, so that although they are in overhanging position with relation to the molds for receiving from the molds the molded articles, they are in like overhanging position when they get at the opposite end of their swing for delivering the transferred articles onto the belt. This is of practical importance because it enables the operation to be continuous without any danger of injury to the pulp articles. The latter at this period are tender and it must be borne in mind that they require gentle handling. My apparatus not only permits this gentle handling, but it is continuous and automatic and requires only one handling.

I have already pointed out that one object of my invention is to do away with the old two-part mold and especially with the necessity for double handling of such a device as that of Keyes, first mentioned. By my invention, I engage a transferring device directly with the stationary mold or rather with the article on the stationary mold and transfer said article by a single movement and by one and the same transferring device directly to the conveyer belt. I regard also as of practical advantage the fact that the article is stationary on a stationary mold and that the transferring device is also stationary at the moment of receiving the article, so that there is no possible danger of lack of registry or of injuring the relatively soft molded article. If either or both the mold or transferring device were moving at the moment of transfer, there would be a tendency to require the article to drop or jump more or less. This is entirely eliminated by my invention. As the actual transfer takes place when the parts are stationary, i. e. at the momentary halting of the parts when they change the direction of movement, it follows that the operation of the moving parts can be maintained at a relatively high speed. The relatively rapid reciprocation of the tank maintains a constant agitation of the stuff, aided somewhat by the fact that the pulp inlet pipe is stationary, and this maintains a uniform condition of pulp delivery to the molds. The tank with its load of pulp is quite light, as it is not necessary to have a tank of large capacity. The lifting rods apply their lifting force at as near the center of weight or resistance as possible and hence a minimum of power is required. The valve mechanism of the mold head as shown facilitates the removal of any obstruction from the mold chamber, cleaning the apparatus, etc., and the ready replacing of any damaged part. The float stops 20, 21, permit any adjustment and fineness of operation and timing required.

As already intimated, I do not intend to limit myself to the precise mechanism of the preferred embodiment of my invention herein shown, as the main features of the invention may be carried out in a wide variety of mechanical constructions and combinations of parts.

My invention is accordingly further described and defined in the form of claims as follows:

1. A pulp molding machine, comprising a stationary suction mold, a stuff tank movable toward and from said mold for immersing and exposing said mold, and means for raising and lowering said tank.

2. A pulp molding machine, comprising a suction stand pipe, a suction mold fast on the upper end of said pipe, a stuff tank surrounding said pipe and mold to reciprocate with relation to said pipe for alternately immersing and exposing the mold, and means for reciprocating said stuff tank.

3. A pulp molding machine, comprising a suction stand pipe, a suction mold removably secured on the upper end of said pipe, a stuff tank surrounding said pipe and mold to reciprocate with relation to said pipe for alternately immersing and exposing the mold, and means for reciprocating said stuff tank.

4. A pulp molding machine, comprising a suction stand pipe, a suction mold fast on the upper end of said pipe, a stuff tank surrounding said pipe and mold to reciprocate with relation to said pipe for alternately immersing and exposing the mold, means for reciprocating said stuff tank, and valve mechanism actuated in unison with the up and down movements of the tank for releasing the molded article on the mold from the suction influence of said pipe when it is desired to remove the molded article.

5. A pulp molding machine, comprising a suction stand pipe, a suction mold fast on the upper end of said pipe, a stuff tank surrounding said pipe and mold to reciprocate with relation to said pipe for alternately immersing and exposing the mold, means for reciprocating said stuff tank, and valve mechanism actuated by the up and down movements of the tank for releasing the molded article on the mold from the suction influence of said pipe when it is desired to remove the molded article.

6. A pulp molding machine, comprising a suction stand pipe, a suction mold fast on the upper end of said pipe, a stuff tank surrounding said pipe and mold to reciprocate with relation to said pipe for alternately immersing and exposing the mold, means for reciprocating said stuff tank, and valve mechanism for said mold consisting of a suction controlling valve for said pipe and a vacuum-breaker valve opening to the outside atmosphere for relieving the suction pressure on the mold.

7. A pulp molding machine, comprising a suction stand pipe, a suction mold fast on the upper end of said pipe, a stuff tank surrounding said pipe and mold to reciprocate with relation to said pipe for alternately immersing and exposing the mold, means for reciprocating said stuff tank, and valve mechanism for said mold consisting of a suction controlling valve for said pipe and a vacuum-breaker valve opening to the outside atmosphere for relieving the suction pressure on the mold and a float actuator for said valves responsive to the rise and fall of the stuff as the tank moves up and down.

8. In a pulp molding machine, a suction pipe, a plurality of molds for said pipe, and a downwardly inclined drain tube or passage from each mold to said suction pipe, forming a vacuum chamber and gravity drain for the molds.

9. In a pulp molding machine, a suction pipe, a plurality of molds radiating from said pipe, and an intermediate valve mechanism consisting of an upper valve opening to the outside atmosphere and a lower valve for controlling said pipe and connecting means between said two valves for opening one when the other is closing.

10. In a pulp molding machine, a suction pipe, a plurality of molds radiating from said pipe, and an intermediate valve mechanism consisting of an upper valve opening to the outside atmosphere and a lower valve for controlling said pipe connecting means between said two valves for opening one when the other is closing and an exterior float, and a stuff container arranged to operate the float by relative movement between the stuff container and the pipe.

11. The combination with a suction pipe of a removable mold head containing a vacuum chamber and having in its lower portion a valve and valve seat for regulating the communication of said chamber with said pipe and having in its upper portion a valve and valve seat for regulating the communication of said chamber with the outside air.

12. The combination with a suction pipe of a removable mold head containing a vacuum chamber and having in its lower portion a removable valve and valve seat for regulating the communication of said chamber with said pipe and having in its upper portion a valve and valve seat for regulating the communication of said chamber with the outside air.

13. A pulp molding machine, comprising a stuff tank for containing the liquid pulp and depositing the same on the mold, a suction mold on the upper side of which said stuff tank deposits the pulp downward, and means for agitating said tank for maintaining the stuff uniform in its delivery to said mold.

14. A pulp molding machine, comprising a stuff tank for containing the liquid pulp and depositing the same on the mold, a mold on which said stuff tank deposits the pulp, a stationary stuff delivery pipe extending toward the bottom of said tank, and means for moving said tank with relation to said mold and to said pipe and thereby agitating the stuff within the tank for uniform delivery to said mold.

15. A pulp molding machine, comprising a stationary mold for receiving the pulp, a movable stuff tank for delivering the pulp to said mold, and a transferring device actuated in response to the movement of said tank for taking the molded article from said stationary mold and transferring it elsewhere.

16. A pulp molding machine, comprising a one-part mold for molding a pulp article, a tank for supplying the pulp thereto, and a swinging transferring device for directly engaging the molded article on said one-part mold while in its original undisturbed position as molded on said one-part mold and carrying the same therefrom for delivery to a conveyer.

17. A pulp molding machine, comprising a mold for receiving and molding the pulp, a tank for supplying the pulp thereto, a transferring device for directly engaging the molded article on said mold, and constructed and arranged to deliver the article thus engaged said mold and transferring device having a period of being stationary while so engaged, and means for applying suction to the transferring device while said parts are thus stationary for causing the molded article to get its adhering engagement with the transferring device while the latter is stationary, and before separating from the mold and beginning the transferring movement prior to said delivery.

18. A pulp molding machine, comprising a mold for molding the pulp article, a tank for supplying the pulp thereto, to be molded on said mold, a transferring device for taking the molded article from said mold and delivering it elsewhere, said transferring device being constructed and arranged to part with said mold at the end of the transferring movement, and means for reciprocating said transferring device toward and from said mold.

19. A pulp molding machine, comprising a mold for molding a pulp article, combined with a transferring device, arranged to swing over approximately in a vertical arc for taking the molded article from said mold and transferring it to a conveyer, and means for axially turning said transferring device while swinging so as to bring it into position to deposit the article downward on said conveyer.

20. A pulp molding machine, comprising a mold for molding the pulp article, combined with a transferring device, arranged to swing over approximately in a vertical arc, and means for turning said transferring device so as to engage the upper side of the molded article at one end of its swing, and deliver said article downward at the other end of its swing.

21. A pulp molding machine, comprising a stationary mold, a rising and falling tank, a swinging transferring device, and operating connections between said tank and transferring device for controlling the movement of one by the movement of the other.

22. In a pulp molding machine, a mold, and transferring mechanism consisting of a hollow shaft, a pressure port and a suction port therein, connections for supplying pressure and suction respectively for said ports at required times, a transferring device and its arm carried by said shaft, and having internal connection with said hollow shaft, and means for rotating said shaft and thereby swinging said device into position to receive by suction a molded article on said mold and to deliver by air pressure said article at a different period in its swinging movement.

23. A pulp molding machine, comprising a stationary mold for receiving pulp, a rising and falling tank for delivering said pulp to said mold and a pulp supply pipe for delivering the pulp within said tank, said tank having an overflow aperture for maintaining an approximate level of pulp with reference to said mold.

In testimony whereof, I have signed my name to this specification, in the presence of two subscribing witnesses.

OLIVER D. HOGUE.

Witnesses:
 WALLACE A. SHIPTON,
 JAMES R. HODDER.